(12) United States Patent
Roy-Auberger

(10) Patent No.: US 7,666,296 B2
(45) Date of Patent: Feb. 23, 2010

(54) PROCESS FOR THE HYDROCONVERSION IN A SLURRY OF HEAVY HYDROCARBONACEOUS FEEDSTOCKS IN THE PRESENCE OF A DISPERSED PHASE AND AN ALUMINA-BASED OXIDE

(75) Inventor: Magalie Roy-Auberger, Nivolas-Vermelle (FR)

(73) Assignee: Institut Francais du Petrole, Rueil Malmaison Cedex (DE)

( * ) Notice: Subject to any disclaimer, the term of this patent is extended or adjusted under 35 U.S.C. 154(b) by 17 days.

(21) Appl. No.: 11/961,688

(22) Filed: Dec. 20, 2007

(65) Prior Publication Data

US 2008/0177124 A1    Jul. 24, 2008

(30) Foreign Application Priority Data

Dec. 21, 2006    (FR) .................................. 06 11405

(51) Int. Cl.
*C07C 4/06* (2006.01)
(52) U.S. Cl. ...................... 208/46; 208/216 R; 502/247; 502/251; 502/253; 502/254; 502/255; 502/258; 502/260; 502/305; 502/321; 502/322; 502/323; 502/325; 502/332; 502/335; 502/336; 502/337; 502/338; 502/354; 502/439
(58) Field of Classification Search .................. 208/133, 208/46, 216 R; 585/752; 423/628; 502/247, 502/251, 260, 305, 320–339
See application file for complete search history.

(56) References Cited

U.S. PATENT DOCUMENTS

| | | | |
|---|---|---|---|
| 3,231,486 A | | 1/1966 | Gatsis et al. |
| 3,361,682 A | * | 1/1968 | Keith et al. .................. 502/314 |
| 4,499,203 A | * | 2/1985 | Toulhoat et al. ............. 502/247 |
| 4,552,650 A | | 11/1985 | Toulhoat et al. |
| 4,584,093 A | | 4/1986 | Toulhoat et al. |
| 5,244,648 A | * | 9/1993 | Dupin et al. ................. 423/626 |
| 5,916,432 A | * | 6/1999 | McFarlane et al. .......... 208/153 |
| 6,066,308 A | * | 5/2000 | Dupin et al. ................. 423/659 |
| 6,309,537 B1 | * | 10/2001 | Harle et al. ............. 208/254 H |
| 6,436,280 B1 | * | 8/2002 | Harle et al. ............. 208/216 R |
| 6,712,955 B1 | * | 3/2004 | Hou et al. ................ 208/216 R |

FOREIGN PATENT DOCUMENTS

| FR | 2528721 A1 | 12/1983 |
|---|---|---|
| FR | 2534828 A1 | 4/1984 |

OTHER PUBLICATIONS

Griboval, A et al (1998). Studies in Surface Science and Catalysis, 106, 181-194.*
Knozinger, H. (1998). "Characterization of unsupported and alumina-supported molybdenum suphides" in Transition Metal Sulphides: Chemistry and Catalysis, ed. by T. Weber, R. Prins, & R.A. Santen, pp. 189-206.*

* cited by examiner

*Primary Examiner*—Robert J Hill, Jr.
*Assistant Examiner*—Brian McCaig
(74) *Attorney, Agent, or Firm*—Millen, White, Zelano, Branigan, P.C.

(57) ABSTRACT

The invention relates to a process for converting heavy hydrocarbonaceous feedstocks carried out in a slurry reactor in the presence of hydrogen and in the presence of a catalytic composition obtained by:

injecting a catalytic precursor of at least one metal of Group VIB and/or Group VIII in at least part of the feedstock to be treated in the absence of an oxide substrate, thermal treatment at a temperature of 400° C. or below, in the presence of $H_2S$ so as to form the dispersed sulphur-containing catalyst, bringing said catalyst into contact with particles of alumina oxide free from silica, said oxide particles having a polymodal porous structure composed of a plurality of juxtaposed agglomerates and each formed from a plurality of acicular platelets, the platelets of each agglomerate being oriented radially in relation to one another and relative to the centre of the agglomerate, said particles having an irregular non-spherical shape and being mainly in the form of fragments obtained by crushing with alumina balls, introducing the catalyst composition obtained into the reactor.

16 Claims, No Drawings

PROCESS FOR THE HYDROCONVERSION IN A SLURRY OF HEAVY HYDROCARBONACEOUS FEEDSTOCKS IN THE PRESENCE OF A DISPERSED PHASE AND AN ALUMINA-BASED OXIDE

TECHNICAL FIELD

The invention relates to a process for the conversion of heavy feedstocks, carried out in a slurry reactor.

PRIOR ART

The slurry process used for the hydroconversion of heavy hydrocarbon fractions is a process known to those skilled in the art and enables hydrorefining of heavy feedstocks in the presence of a soluble catalytic precursor to be obtained. In patent U.S. Pat. No. 3,231,488, the inventors claim that metals injected in an organometallic form, in the presence of hydrogen and/or of $H_2S$, form a finely dispersed catalytic phase permitting hydrorefining of the residue after injection into the feedstock. This catalytic phase has a very fine size and passes through the reaction zone with the liquid. In patent U.S. Pat. No. 4,244,839, C. L. Aldridge and R. Bearden describe a catalytic phase, in particular for the hydroconversion of residues, prepared from a catalytic precursor soluble in oil and which is thermally decomposable, brought into contact with a feedstock containing Conradson carbon at a high temperature and in the presence of hydrogen and $H_2S$.

Patents U.S. Pat. No. 4,376,037 and U.S. Pat. No. 4,389,301 (Chevron) describe the contacting of an oil and hydrogen in the presence of a dispersed hydrogenation catalyst and porous particles not containing hydrogenating compounds and preferably low in cost. The porous solid is typically a spent FCC catalyst with a particle size of 10 to 50 microns. The particles are preferably held in a confined bed rather than being entrained with the feedstock. The authors mention a synergistic effect between the dispersed catalyst and the porous particles, which permits a reduction in contents of metals and asphaltenes in the effluents.

In patents U.S. Pat. No. 4,937,218 and U.S. Pat. No. 6,384,091 from the Intevep Company, a hydroconversion process is presented that uses a regenerable catalyst formed in situ (that is to say in the actual slurry reactor) comprising an active phase and a refractory substrate.

According to these patents, the advantage is to form a regenerable catalyst. In the reaction zone, the organometallic salt interacts with the refractory substrate to form a porous supported catalyst having good activity in HDM (hydrodemetallization), HDS (hydrodesulphuration) and HDN (hydrodenitrogenation).

The Applicant has discovered that, surprisingly, the addition of an alumina-based oxide with a polymodal texture, of the chestnut-bur type, composed of a plurality of juxtaposed agglomerates, each formed from a plurality of acicular platelets, to a dispersed and previously sulphurated catalyst, in a slurry process for the hydroconversion of heavy hydrocarbonaceous feedstocks containing metals, makes it possible to obtain improved performance in terms of deasphalting and demetallization, but also in terms of stability of the effluents.

DESCRIPTION OF THE INVENTION

The invention relates to a process for converting heavy hydrocarbonaceous feedstocks, carried out in a slurry reactor in the presence of hydrogen and in the presence of a catalytic composition obtained by:

injecting a catalytic precursor of at least one metal of Group VIB and/or Group VIII in at least part of the feedstock to be treated in the absence of an oxide substrate, thermal treatment at a temperature of 400° C. or below, in the presence of $H_2S$ so as to form the dispersed sulphur-containing catalyst, bringing said catalyst into contact with particles of alumina oxide free from silica, said oxide particles having a polymodal porous structure composed of a plurality of juxtaposed agglomerates and each formed from a plurality of acicular platelets, the platelets of each agglomerate being oriented radially in relation to one another and relative to the centre of the agglomerate, said particles having an irregular non-spherical shape and being mainly in the form of fragments obtained by crushing with alumina balls, introducing the catalyst composition obtained into the reactor.

The dispersed and sulphurated catalyst is preferably brought into contact with said particles of alumina oxide by injecting oxide particles into the feedstock containing the sulphurated dispersed catalyst.

In a preferred embodiment of the invention, said oxide particles consisting essentially of alumina are obtained by crushing with alumina balls and prepared by a process including the following steps:
a) granulation from an active alumina powder having a poorly crystallized and/or amorphous structure, so as to obtain agglomerates in the form of beads;
b) maturing of said beads in a moist atmosphere between 60 and 100° C. and then their drying;
c) sieving in order to recover a fraction of said beads;
d) crushing of said fraction;
e) calcination of at least part of said crushed fraction at a temperature of between 250 and 900° C.;
f) acid impregnation and hydrothermal treatment at a temperature of between 80 and 250° C.;
g) drying and then calcination at a temperature of between 500 and 1100° C.

Carrying out these steps in this order makes it possible to obtain oxide particles having improved mechanical strength.

The alumina-based oxide does not contain catalytic metals. Moreover, it does not contain elements such as silica ($SiO_2$), silica-alumina, titanium dioxide ($TiO_2$), zeolites or clays, alone or as a mixture. These elements are in point of fact capable of significantly increasing the surface acidity of said oxide. Under the reaction conditions, this acidity is unacceptable since it generates considerable coking and blocking of the porosity of the alumina-based oxide, which may no longer carry out its function.

On the other hand, the alumina-based oxide may contain elements that do not generate acidity, such as the rare earths, alkaline-earth metals or else phosphorus if is introduced at a concentration of less than 2% by weight.

According to the invention, the alumina oxide particles used, obtained by crushing, mainly in an irregular and non-spherical form, have the following properties:
the loss on ignition measured by calcination at 1000° C. lies between approximately 1 and 15% by weight;
a specific surface area of between 75 and 250 $m^2/g$;
a total pore volume (TPV) of between 0.5 and approximately 2.0 $cm^3/g$;
a pore distribution, determined by Hg porosimetry, characterized as follows:
% of the total pore volume in pores with a mean diameter less than 100 Å: between 0 and 10

% of the total pore volume in pores with a mean diameter between 100 and 1000 Å: between 40 and 80;

% of the total pore volume in pores with a mean diameter between 1000 and 5000 Å: between 5 and 60, preferably between 8 and 35;

% of the total pore volume in pores with a mean diameter between 5000 and 10 000 Å: between 3 and 50, preferably between 5 and 30;

% of the total pore volume in pores with a mean diameter greater than 10 000 Å: between 5 and 20.

In a preferred manner, the percentage total pore volume in pores with a mean diameter greater than 1000 Å is greater than 20% and the mean diameter of pores with a diameter greater than 1000 Å lies between 4000 and 6000 Å.

According to the invention, the mean size of the oxide particles lies between 10 and 1000 microns, preferably between 100 and 800 microns.

The concentration of oxide particles in the heavy feedstock lies between 0.1 and 20% by weight, preferably between 0.5 and 10% by weight.

The catalytic precursor injected into the catalytic composition contains at least one catalytic metal or metal compound of Group VIB and/or of Group VIII (Groups 8, 9 and 10 of the new notation of the Periodic Table of the Elements), optionally with at least one doping element from the group consisting of phosphorus, boron and the halogens.

It may be chosen from the organometallic compounds that are soluble in the hydrocarbonaceous feedstock, such as naphthenates, octoates, for example of molybdenum, or preferably chosen from compounds that are soluble in an aqueous phase.

In a preferred manner, the catalytic precursor is a salt or an acid that is soluble in the aqueous phase, such as ammonium heptamolybdate, phosphomolybdic acid, nickel nitrate or nickel acetate.

Advantageously, it may also be a mixed compound of the heteropolyanion type containing, at the same time, molybdenum, nickel and phosphorus, or at the same time molybdenum, cobalt and phosphorus. This may be, for example but not in a limiting manner, a compound of which the structure corresponds to the formula $H_xPCo(Ni)Mo_{11}O_{40}^{(7-x)}$.

According to a preferred procedure of the invention, the catalytic precursor is soluble in the aqueous phase and is injected with at least part of the feedstock in the form of an emulsion in the absence of oxide particles.

Whatever the form of the catalytic precursor injected into at least part of the feedstock, this is then thermally treated at a temperature less than or equal to 400° C., preferably between 250 and 400° C., in the presence of $H_2S$ dissolved in the feedstock, so as to promote the decomposition of the catalytic precursor in the sulphide phase, which is the active phase.

The $H_2S$ may be derived for example from the $H_2S$ contained in the hydrogen recycled to the slurry reactor, from the thermal decomposition of organosulphur-containing molecules present in the feedstock.

The alumina oxide particles are put into contact in the feedstock, preferably by injection, after formation of the sulphide phase of the catalytic metal.

In this way, the catalytic system is formed from a dispersed catalyst and an oxide, each having its own specific function, and interactions between the oxide and the catalytic sulphide phase are not promoted. Thus, on the one hand, the fine dispersion of the catalytic phase makes it possible to promote hydrogenation and conversion of coarse hydrocarbonaceous structures without accessibility being harmed by the presence of a substrate, and, on the other hand, the oxide may act as a trap for asphaltenes without its porosity being modified in any way by deposition of the catalytic phase.

The conditions favourable to hydroconversion in a slurry are in general as follows:

total pressure of between 1 and 50 MPa, preferably 2-30 MPa, partial hydrogen pressure of between 1 and 50 MPa, preferably 2-30 MPa, temperature of between 300 and 600° C., preferably between 350 and 500° C., residence time of liquid hydrocarbons in the reaction zone of between 5 minutes and 20 hours, preferably between 1 h and 10 h.

The heavy feedstocks treated by the process of the invention are heavy hydrocarbonaceous feedstocks such as distillates or residues coming from the vacuum distillation of petroleum. This may also be coal or coke introduced as a suspension into liquid petroleum fractions.

More generally, the process is particularly suited to the treatment of petroleum fractions such as atmospheric residues obtained by atmospheric distillation, at the bottom of the column or a fraction of these residues, or residues coming from vacuum distillation, (bottom of the column). These fractions are generally characterized by a boiling point greater than 540° C. for at least 80% by weight of compounds of the feedstock having initial boiling points above 300° C. They generally have a viscosity below 40 000 cSt at 100° C. and preferably less than 20 000 cSt at 100° C., an Ni+V metal content of greater than 1 ppm by weight, and an asphaltene content (precipitated in heptane) of greater than 0.1% by weight.

Once formed, the dispersed catalyst and the oxide particles, consisting substantially of alumina, form the catalytic composition that circulates with the hydrocarbon phase in the reactor and, at its outlet, at concentrations of between 10 and 1000 ppm by weight based on the heavy feedstock, preferably between 50 and 500 ppm by weight for the catalytic metal or metals (concentration expressed by taking into account the elemental metal or metals), between 0.1 and 20% by weight, preferably between 0.5 and 10% by weight for the oxide consisting substantially of alumina, without any interaction between the two being promoted. The concentrations of active phase and of oxide in the hydrocarbon phase are identical at the inlet and outlet of the reactor.

In one embodiment, part of the converted effluents may be recycled upstream of the unit operating the hydroconversion process. These recycled effluents contain part of the catalytic composition that is also recycled.

Preparation of the Alumina-Based Oxide

The alumina-based oxide has a porous structure composed of a plurality of juxtaposed agglomerates, each formed from a plurality of acicular platelets, the platelets of each agglomerate being generally oriented radially to one another and in relation to the centre of the agglomerate, said oxide having an irregular and non-spherical form and mainly being present in the form of fragments obtained by crushing with alumina balls, and prepared by a process including the following steps:

a) granulation from an active alumina powder having a poorly crystallized and/or amorphous structure, so as to obtain agglomerates in the form of beads;

b) maturation of said beads in a moist atmosphere between 60 and 100° C. and then their drying;

c) sieving in order to recover a fraction of said beads;

d) crushing of said fraction;

e) calcination of at least part of said crushed fraction at a temperature of between 250 and 9000;

f) acid impregnation and hydrothermal treatment at a temperature of between 80 and 250° C.;

g) drying and then calcination at a temperature of between 500 and 1100° C.

According to the invention, the mean size of the oxide particles lies between 10 and 1000 microns, preferably between 100 and 800 microns.

a) The first step, termed granulation, aims at forming substantially spherical agglomerates from an active alumina powder having a poorly crystallized and/or amorphous structure according to the method described in FR 1 438 497. This method consists in moistening the active alumina having poorly crystallized and/or amorphous structure with the aid of an aqueous solution, and then of agglomerating it in a granulator or pelletizer. In a preferred manner, one or more pore-forming agents are added during granulation. The pore-forming agents that may be used are notably wood flour, charcoal, cellulose, starches, naphthalene and, in a general manner, all organic compounds capable of being eliminated by calcination.

An alumina with a poorly crystallized structure is understood to mean an alumina such that X-ray analysis gives a diagram having only one or a few diffuse lines corresponding to the crystalline phases of low-temperature-transition aluminas and essentially comprising khi, rho, eta, gamma and pseudogamma phases and mixtures thereof. The active alumina used is generally obtained by rapid dehydration of aluminium hydroxides such as bayerite, hydrargillite or gibbsite, nordstrandite or aluminium oxyhydroxides such as boehmite and diaspore. This dehydration may be carried out in any suitable apparatus with the aid of a flow of hot gas. The inlet temperature of the gases into the apparatus generally varies from approximately 400° C. to 1200° C. and the contact time of the hydroxide or oxyhydroxide with the hot gases generally lies between a fraction of a second and 4 to 5 seconds.

The specific surface area measured by the BET method for active alumina obtained by rapid dehydration of hydroxides or oxyhydroxides generally varies between approximately 50 and 400 m$^2$/g, and the diameter of the particles generally lies between 0.1 and 300 micrometres and preferably between 1 and 120 micrometres. The loss on ignition measured by calcination at 1000° C. generally varies between 3 and 15%, which corresponds to an $H_2O/Al_2O_3$ molar ratio of between 0.17 and 0.85.

According to one particular embodiment, it is preferable to use an active alumina derived from the rapid dehydration of Bayer hydrate (hydrargillite) which is industrial aluminium hydroxide that is easily accessible and very low in cost. Such an active alumina is well known to a person skilled in the art, the method for its preparation being in particular described in FR 1 108 011.

The active alumina employed may be used as it is or after having been treated so that its soda content expressed as $Na_2O$ is less than 1000 ppm by weight. The active alumina employed may have been ground or not.

b) The spherical agglomerates obtained are then matured in a moist atmosphere at a low temperature, preferably between 60 and approximately 100° C. followed by drying generally carried out between 100 and 120° C.

c) At this stage, the agglomerates, substantially in the form of beads, have sufficient mechanical strength to be sieved so that the particle size range may be selected that is suitable for the final particle size desired. Thus for example, in order to obtain a final oxide within the size range of 20 and 1000 microns, a fraction of the beads will be sieved and selected in the range of 1000-2000 microns.

d) Next, the fraction of beads in the selected size range is subjected to crushing. This operation is carried out in any type of crusher known to a person skilled in the art and preferably in a ball mill. It has a duration of between 5 and 60 minutes, preferably between 10 and 30 minutes.

Following the crushing step, the alumina oxide is mainly in the form of fragments of very irregular and non-spherical shape. In order better to define the form obtained, it may be stated that the fragments may be in the form of broken beads, without however having very clean fracture faces, or may be in the form of solids of which the nearest geometric shape would be an irregular polyhedron, not necessarily having flat faces. The term "mainly" means that more than 50% by weight, and preferably at least 60% by weight, of spherical agglomerates have substantially undergone a modification of their shape during crushing, the complementary part representing spherical agglomerates that have remained intact. Indeed, it is well known that, since crushing is an unsophisticated operation of low efficiency, it is common for a not inconsiderable part of the grains not to be crushed.

e) After crushing, at least some of the fragments are calcined at a temperature of between approximately 250° C. and approximately 900° C., preferably between 500 and 850° C. The part that is not calcined generally corresponds to "out of specification" fines. In a preferred manner, the entire crushed fraction is calcined.

f) The oxide is then treated by acid impregnation followed by hydrothermal treatment according to the method described in U.S. Pat. No. 4,552,650 that may be applied in its entirety for the present process, that is to say:

the crushed agglomerates are treated in an aqueous medium comprising a mixture of at least one acid making it possible to dissolve at least part of the alumina of the oxide, and at least one compound providing an anion capable of combining with the aluminium ions in solution, the latter compound being a chemical individual distinct from the aforementioned acid, the crushed agglomerates thus treated are subjected simultaneously or subsequently to a hydrothermal treatment (or autoclaving).

An acid that enables at least part of the alumina of the oxide to be dissolved is understood to be any acid that, put into contact with the active alumina agglomerates defined above, puts at least some of the aluminium ions into solution. The acid dissolves at least 0.5% and at most 15% by weight of the alumina of the agglomerates. Its concentration in the aqueous treatment medium is less than 20% and preferably between 1 and 15% by weight.

Strong acids such as nitric acid, hydrochloric acid, perchloric acid or sulphuric acid are preferably used, or weak acids such as acetic acid, employed at a concentration such that their aqueous solution has a pH below approximately 4.

A compound providing an anion capable of combining with the aluminium ions in solution is understood to be any compound capable of releasing, in solution, an A(−n) anion capable of forming with the Al(3+) cations products in which the n(A/Al) atomic ratio is less than or equal to 3.

One particular case of these compounds may be illustrated by basic salts of general formula $Al_2(OH)_xA_y$ in which $0<x<6$; $ny<6$ and n represents the number of feedstocks of the anion A.

The concentration of this compound in the aqueous treatment medium is less than 50% by weight and preferably between 3% and 30%.

Compounds are preferably used that are capable of releasing, in solution, anions chosen from the group consisting of nitrate, chloride, sulphate, perchlorate, chloroacetate, dichloroacetate, trichloroacetate, bromoacetate, dibromoacetate anions and anions of general formula RCOO(−), in which R represents a radical taken from the group comprising H, $CH_3$, $C_2H_5$, $CH_3CH_2$ and $(CH_3)_2CH$.

Compounds capable of releasing the A(−n) anion in solution may perform this release either directly, for example by dissociation, or indirectly, for example by hydrolysis. The compounds may in particular be chosen from the group comprising: inorganic or organic acids, anhydrides, organic or inorganic salts, esters. Among inorganic salts, mention may be made of alkali metal salts or alkaline-earth metal salts soluble in an aqueous medium, such as those of sodium, potassium, magnesium or calcium, ammonium salts, aluminium salts and rare-earth salts.

This first treatment may be carried out either by dry impregnation of the agglomerates or by immersing the agglomerates in the aqueous acid solution. Dry impregnation is understood to mean bringing the alumina agglomerates into contact with a volume of solution of less than or equal to the total pore volume of the treated agglomerates.

According to a particularly preferred embodiment, mixtures of nitric and acetic acid or nitric and formic acid are used as the aqueous medium.

The hydrothermal treatment is carried out at a temperature of between approximately 80 and approximately 250° C., for a period of time between approximately 5 minutes and approximately 36 hours.

This hydrothermal treatment does not bring about any loss of alumina.

A temperature of between 120 and 220° C. for a period of time of between 15 minutes and 18 hours is preferably used.

This treatment constitutes a hydrothermal treatment of the active alumina agglomerates that brings about the conversion of at least part of this into boehmite. This hydrothermal treatment (autoclaving) may be carried out either under saturated vapour pressure, or under a partial water vapour pressure of at least 70% of the saturated vapour pressure corresponding to the treatment temperature.

The association of an acid that dissolves at least some of the alumina and an anion that enables the products described above to be formed during the hydrothermal treatment involves the formation of a particular boehmite, that is a precursor of acicular platelets of the oxide, the growth of which proceeds radially from crystallization seeds.

In addition, the concentration of the acid and the compound in the treatment mixture and the hydrothermal treatment conditions employed are such that there is no loss of alumina. The increase in porosity following treatment is therefore due to an expansion of the agglomerates during treatment and not to a loss of alumina.

g) Finally, the crushed agglomerates are then optionally dried at a temperature generally between approximately 100 and 200° C. for a sufficient period to remove the water that is not chemically bound. The agglomerates are then subjected to thermal activation at a temperature between approximately 500° C. and approximately 1100° C. for a period of between approximately 15 minutes and 24 hours.

The active alumina oxide obtained, mainly in an irregular non-spherical form, generally has the following properties: the loss on ignition measured by calcination at 1000° C. lies between approximately 1 and approximately 15% by weight, the specific surface area lies between approximately 80 and approximately 300 m$^2$/g, and their total pore volume lies between approximately 0.45 and approximately 1.5 cm$^3$/g.

The resulting crushed alumina agglomerates have, moreover, in a preferred manner, the following properties:
   a specific surface area of between 75 and 250 m$^2$/g;
   a tamped density of between approximately 0.25 and 0.65 g/cm$^3$;
   a total pore volume (TPV) of between 0.5 and approximately 2.0 cm$^3$/g;
   a pore distribution, determined by the Hg porosimetry technique, preferably characterized as follows:
   % of the total pore volume in pores with a mean diameter less than 100 Å: between 0 and 10,
   % of the total pore volume in pores with a mean diameter between 100 and 1000 Å: between 40 and 80;
   % of the total pore volume in pores with a mean diameter between 1000 and 5000 Å: between 5 and 60, preferably between 8 and 35;
   % of the total pore volume in pores with a mean diameter between 5000 and 10 000 Å: between 3 and 50, preferably between 5 and 30;
   % of the total pore volume in pores with a mean diameter greater than 10 000 Å: between 5 and 20.

The aforementioned process for preparing the alumina oxide makes it possible in particular to adjust the distribution of pore volumes according to the size of the pores. In particular, it makes it possible to increase the proportion of pores lying between 100 and 1000 Å, to reduce the proportion of pores of less than 100 Å and to reduce the proportion of pores of greater than 5000 Å by slight modification of the proportion of pores lying between 1000 and 5000 Å.

In a preferred manner, the percentage total pore volume in pores with a mean diameter greater than 1000 Å is greater than 20% and the mean diameter of the pores with a diameter greater than 1000 Å lies between 4000 and 6000 Å.

EXAMPLE 1

Preparation of Alumina Agglomerates, Oxide A (According to the Invention)

The raw material was an alumina obtained by very rapid decomposition of hydrargillite in a stream of hot air (T=1000°). The product obtained consisted of a mixture of transition aluminas: (khi) and (rho) aluminas. The specific surface area of this product was 300 m$^2$/g and loss on ignition (LOI) 5%.

The alumina was (after crushing) in powder form of which the mean diameter of the particles was 7 micrometres.

This alumina was mixed with wood flour as a pore-forming agent (15% by weight) and then formed in a granulator or pelletizer for a period of time adapted to the desired particle size. The agglomerates obtained were subjected to a maturing step by passing steam at 100° C. for 24 hours and then dried. They were next sieved, then crushed and finally calcined.

These beads were then impregnated dry with a solution containing for example a mixture of nitric acid and acetic acid in the aqueous phase in an impregnating drum. Once impregnated, they were introduced into an autoclave for approximately 2 hours at a temperature of 210° C. and at a pressure of 20.5 bar.

Crushed alumina agglomerates according to the invention were obtained at the outlet of the autoclave, and these were dried for 4 hours at 100° C. and calcined for 2 hours at 650° C.

The agglomerates had a size of between 200 and 500 microns. Their pore volume was equal to 0.95 cm$^3$/g. The specific surface area of the oxide was 130 m$^2$/g.

The pore distribution, determined by the Hg porosimetry technique (all measurements with Hg in this text were performed according to standard 4284-92 with a wetting angle of 140°), was characterized as follows:
- % of the total pore volume in pores with a mean diameter less than 100 Å: 0.2;
- % of the total pore volume in pores with a mean diameter between 100 and 1000 Å: 75;
- % of the total pore volume in pores with a mean diameter between 1000 and 5000 Å: 12.5;
- % of the total pore volume in pores with a mean diameter between 5000 and 10 000 Å: 6;
- % of the total pore volume in pores with a mean diameter greater than 10 000 Å: 6.5%.

The percentage total pore volume in pores with a mean diameter greater than 1000 Å was 25% and the mean diameter of pores greater than 1000 Å was equal to 5000 Å.

EXAMPLE 2

Preparation of Crushed Alumina Oxide, Oxide B (Not According to the Invention)

The raw material was a matrix composed of boehmite or alumina gel marketed under the name Versal 250 by the La Roche Company. This gel was mixed with an aqueous solution containing 52.7% nitric acid (1% of acid by weight per gram of dry gel) and then mixed for 20 minutes in a Z-blade mixer (Aoustin MX2). The paste was then mixed with an aqueous solution containing 20.3% ammonia (40 mol % of ammonia per mole of acid) for 5 minutes in the same mixer. Following this mixing, the paste obtained was passed through a die having cylindrical orifices with a diameter of less than or equal to 1.0 mm on a piston extruder (Retma). The extrudates were then dried over night at 120° C. and then calcined at 750° C. for two hours in a flow of moist air containing 200 g of water/kg of dry air and finally crushed so as to obtain a particle size of the fragments of between 200 and 500 microns.

This alumina oxide had moreover a specific surface area of 190 m²/g, a total pore volume of 0.95 cm³/g and a bimodal pore distribution. The pore distribution, determined by the Hg porosimetry technique was characterized as follows:
- % of the total pore volume in pores with a mean diameter less than 100 Å: 5;
- % of the total pore volume in pores with a mean diameter between 100 and 1000 Å: 75;
- % of the total pore volume in pores with a mean diameter between 1000 and 5000 Å: 12;
- % of the total pore volume in pores with a mean diameter between 5000 and 10 000 Å: 6;
- % of the total pore volume in pores with a mean diameter greater than 10 000 Å: 2.

The percentage total pore volume in pores with a mean diameter greater than 1000 Å was 15% and the mean diameter of pores greater than 1000 Å was equal to 3000 Å.

This alumina oxide did not have a pore structure of the chestnut bur type.

EXAMPLE 3

Comparison of Performance in Hydroconversion of Residues in Slurry Mode, in a Batch Reactor The performance, in terms of in residue hydroconversion in slurry mode, while considering the addition of alumina oxide A (in accordance with the invention) or B (not in accordance with the invention) were compared in a batch reactor. Molybdenum octoate was used as a catalytic precursor. It was mixed with the feedstock in an amount of 300 ppm of Mo.

The feedstock used was a Zuata atmospheric residue (AR), rich in metals, the properties were as follows:

| Charge | AR ZUATA |
| --- | --- |
| Spec. grav | 1.045 |
| Sulphur (% by weight) | 4.35 |
| Nitrogen (ppm by weight) | 9000 |
| Viscosity (cSt) | 900 |
| Viscosity temperature (° C.) | 125 |
| Conradson carbon (% by weight) | 19.95 |
| Asphalt. C7 (% by weight) | 13 |
| Ni (ppm by weight) | 134 |
| V (ppm by weight) | 660 |
| DS: PI ° C. | 295 |
| DS: 5% vol. ° C. | 375 |
| DS: 10% vol. ° C. | 419.5 |
| DS: 30% vol. ° C. | 540 |
| DS: 48% vol. ° C. | 613.5 |
| D1160: 60% vol. ° C. | — |

The hydroconversion conditions in the batch reactor were as follows:
- temperature: 410° C.
- $H_2$ pressure: 150 bar
- residence time: 1 h 30.

For experiment 1 according to the invention, the test in an autoclave was carried out in two steps:
- step of converting the catalytic precursor into a sulphide phase in the absence of alumina oxide: molybdenum octoate was mixed with the AR feedstock in the presence of DMDS (dimethyldisulphide), at a hydrogen pressure of 100 bar. Everything was heated to 350° C. for one hour: this temperature enabled DMDS to decompose, which in this way generated an $H_2S$ partial pressure without thermal conversion reactions being brought into play. This step allowed sulphuration of the molybdenum to take place and $MoS_2$ to be formed, this being dispersed in the feedstock.
- the reactor was then cooled to a temperature below 100° C., $H_2$ and $H_2S$ were stripped with nitrogen, it being possible for the reactor to be open while maintaining stirring, and the oxide A was added in an amount of 2% by weight relative to the feedstock. The hydroconversion step was then started under the conditions defined above: temperature: 410° C., $H_2$ partial pressure: 150 bar, residence time: 1 h 30.

In experiment 2, Mo octoate and the oxide B were added to the feedstock containing 300 ppm of Mo in an amount of 2% by weight and everything was placed directly under hydroconversion conditions identical to those of experiment 1: 410° C., 150 bar hydrogen pressure, residence time 1 h 30. Sulphuration was carried out in the reactor (in situ) under the effect of the operating conditions employed for hydroconversion.

In experiment 3 (comparative experiment), no oxide was added, but the experiment was carried out in two steps (sulphuration and hydroconversion) as for experiment 1.

At the end of the test, the solid phase was separated from the liquid phase by hot filtration, and analyses of metals and asphaltenes were performed on the filtrate in order to determine the % HDM (hydrodemetallation) and HDAsph (Hydroasphaltage).

| Experiment | Catalyst/oxide | Conv (wt %) | HDM (wt %) | HDAsph |
|---|---|---|---|---|
| 1 (in accordance with the invention) | Mo octoate/ oxide A | 52 | 80 | 62 |
| 2 (not in accordance with the invention) | Mo octoate/ oxide B | 50 | 75 | 59 |
| 3 (not in accordance with the invention) | Mo octoate/— | 51 | 73 | 58 |

The addition of oxide A to the reaction medium made it possible to improve the HDM performance and the HDAsph performance significantly.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The preceding examples can be repeated with similar success by substituting the generically or specifically described reactants and/or operating conditions of this invention for those used in the preceding examples.

The entire disclosures of all applications, patents and publications, cited herein and of corresponding French application No. 06/11.405, filed Dec. 21, 2006 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Process for converting heavy feedstocks carried out in a slurry reactor in the presence of hydrogen and in the presence of a catalytic composition obtained by:
    injecting a catalytic precursor of at least one metal of Group VIB and/or Group VIII in at least part of the feedstock to be treated in the absence of an oxide substrate,
    thermal treatment at a temperature of 400° C. or below, in the presence of $H_2S$ so as to form the dispersed sulphur-containing catalyst in the feedstock,
    bringing said catalyst into contact with particles of alumina oxide free from silica, from silica-alumina, from titanium dioxide ($TiO_2$), from zeolite and from clay, alone or in a mixture, said oxide particles having a polymodal porous structure composed of a plurality of juxtaposed agglomerates and each formed from a plurality of acicular platelets, the platelets of each agglomerate being oriented radially in relation to one another and relative to the centre of the agglomerate, said particles having an irregular non-spherical shape and being mainly in the form of fragments obtained by crushing with alumina balls,
    introducing the catalyst composition obtained into the reactor.

2. Process according to claim 1, in which the oxide particles have the following properties:
    a loss on ignition measured by calcination at 1000° C. lies between approximately 1 and 15% by weight;
    a specific surface area measured by the BET method of between 75 and 250 $m^2/g$;
    a total pore volume measured by Hg porosimetry of between approximately 0.5 and 2.0 $cm^3/g$;
    a pore distribution, determined by the Hg porosimetry technique, such that:
    % of the total pore volume in pores with a mean diameter less than 100 Å: between 0 and 10;
    % of the total pore volume in pores with a mean diameter between 100 and 1000 Å: between 40 and 80;
    % of the total pore volume in pores with a mean diameter between 1000 and 5000 Å: between 5 and 60;
    % of the total pore volume in pores with a mean diameter between 5000 and 10 000 Å: between 3 and 50;
    % of the total pore volume in pores with a mean diameter greater than 10 000 Å: between 5 and 20.

3. Process according to claim 2, in which the percentage total pore volume in pores with a mean diameter greater than 1000 Å is greater than 20% and the mean diameter of pores with a diameter greater than 1000 Å lies between 4000 and 6000 Å.

4. Process according to claim 1, in which said catalytic precursor is an organometallic compound soluble in the hydrocarbonaceous feedstock.

5. Process according to claim 1, in which said catalytic precursor is a compound soluble in an aqueous phase.

6. Process according to claim 5, in which said catalytic precursor is a salt or an acid.

7. Process according to claim 6, in which said catalytic precursor is chosen from ammonium heptamolybdate, phosphomolybdic acid, nickel nitrate and nickel acetate.

8. Process according to claim 5, in which said catalytic precursor is a mixed compound of the heteropolyanion type containing at the same time molybdenum, nickel and phosphorus or at the same time molybdenum, cobalt and phosphorus.

9. Process according to claim 1, in which the dispersed catalyst is present in the heavy feedstock at a concentration (expressed with respect to the elemental metal or metals of between 10 and 1000 ppm.

10. Process according to claim 1, in which the oxide particles are obtained by crushing with alumina balls and prepared in accordance with the following steps:
    a) granulation from an active alumina powder having a poorly crystallized and/or amorphous structure, so as to obtain agglomerates in the form of beads;
    b) maturation of said beads in a moist atmosphere between 60 and 100° C. and then their drying;
    c) sieving in order to recover a fraction of said beads;
    d) crushing of said fraction;
    e) calcination of at least part of said crushed fraction at a temperature of between 250 and 900° C.,
    f) acid impregnation and hydrothermal treatment at a temperature of between 80 and 250° C.,
    g) drying and then calcination at a temperature of between 500 and 1100° C.

11. Process according to claim 1, in which the mean size of the oxide particles lies between 10 and 1000 microns.

12. Process according to claim 11, in which the mean size of the oxide particles lies between 100 and 800 microns.

13. Process according to claim 1, in which said contacting is carried out by injecting the alumina oxide particles with the dispersed and sulphurated catalyst.

14. Process according to claim 1, in which the concentration of oxide particles in the heavy feedstock lies between 0.1 and 20% by weight.

15. Process according to claim 14, in which the concentration of oxide particles in the heavy feedstock lies between 0.5 and 10% by weight.

16. Process according to claim 1, for which the slurry reactor is fed with a feedstock for which the boiling point is above 540° C. for at least 80% by weight of compounds of the feedstock having initial boiling points above 300° C., and operates under the following conditions:
    total pressure of between 1 and 50 MPa,
    hydrogen partial pressure of between 1 and 50 MPa,
    temperature of between 300 and 600° C.,
    residence time of hydrocarbons in the reaction zone of between 5 minutes and 20 hours.

\* \* \* \* \*